(12) United States Patent
Brown et al.

(10) Patent No.: US 6,894,701 B2
(45) Date of Patent: May 17, 2005

(54) TYPE SIZE DEPENDENT ANTI-ALIASING IN SUB-PIXEL PRECISION RENDERING SYSTEMS

(75) Inventors: David C. Brown, Redmond, WA (US);
John C. Platt, Bellevue, WA (US);
Michael Duggan, Kirkland, WA (US);
Gregory Hitchcock, Woodinville, WA (US); Beat Stamm, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 218 days.

(21) Appl. No.: 10/146,424

(22) Filed: May 14, 2002

(65) Prior Publication Data

US 2003/0214513 A1 Nov. 20, 2003

(51) Int. Cl.$^7$ ................................................ G09G 5/00
(52) U.S. Cl. ...................................... 345/613; 382/269
(58) Field of Search ................................ 345/611, 613, 345/467, 470; 382/269, 260–275

(56) References Cited

U.S. PATENT DOCUMENTS

| | | | | | |
|---|---|---|---|---|---|
| 4,851,825 A | * | 7/1989 | Naiman | ...................... | 345/596 |
| 5,929,866 A | * | 7/1999 | Arnold | ....................... | 345/471 |
| 6,005,588 A | * | 12/1999 | Guha | ......................... | 345/467 |
| 6,130,723 A | * | 10/2000 | Medin | ....................... | 348/607 |
| 6,154,576 A | * | 11/2000 | Anderson et al. | ............ | 382/269 |
| 6,188,385 B1 | * | 2/2001 | Hill et al. | ................... | 345/614 |
| 6,239,783 B1 | * | 5/2001 | Hill et al. | ................... | 345/694 |
| 6,282,327 B1 | * | 8/2001 | Betrisey et al. | ............. | 382/299 |
| 6,339,426 B1 | * | 1/2002 | Lui et al. | .................... | 345/467 |
| 6,563,502 B1 | * | 5/2003 | Dowling et al. | .......... | 345/469.1 |
| 6,650,372 B2 | * | 11/2003 | Toft | ............................ | 348/615 |
| 6,674,436 B1 | * | 1/2004 | Dresevic et al. | ............ | 345/472 |
| 6,756,992 B2 | * | 6/2004 | Toji et al. | ................... | 345/613 |
| 2002/0003543 A1 | * | 1/2002 | Deering | ....................... | 345/581 |

OTHER PUBLICATIONS

Warnock, John E.; "The Display of Characters Using Gray Level Sample Arrays"; ACM, 1980, pp. 302–307.*
Warnock, John E.; "The Display of Characters Using Gray Level Sample Arrays"; ACM, 1980, pp. 302–307.*
Gibson, Steve, "Sub–Pixel Font Rendering Technology: How It Works", last edited Oct. 2003 www.grc.com/ct-what.htm.*
Gibson, Steve, "Sub–Pixel Font Rendering Technology: Implementation Details", Aug. 12, 1999 (as cited in US Patent# 6,756,992)www.grc.com.*

* cited by examiner

*Primary Examiner*—Matthew C. Bella
*Assistant Examiner*—Alysa N. Brautigam
(74) *Attorney, Agent, or Firm*—Workman Nydegger

(57) ABSTRACT

Methods and systems for selecting different anti-aliasing filters to be applied to objects of image data rendered with pixel sub-component precision based on the attributes of the objects of the graphics image. For example, when rendering a character traditional anti-aliasing applied in the direction parallel to the striping of the pixel sub-components is adapted to the unique requirements of different character font sizes such that a large amount of anti-aliasing is applied to large font sizes while a small amount of anti-aliasing is provided for characters at small font sizes. Displaced sampling is utilized to determine the alpha values for a plurality of vertical samples for each RGB pixel sub-component. The selected anti-aliasing filter is applied to the alpha values to determine the luminous intensity values of the RGB pixel sub-components.

11 Claims, 8 Drawing Sheets

| | | Weight Factors | | | | | | |
|---|---|---|---|---|---|---|---|---|
| Filter # | Font Size | Top Adjacent α | 0th α | 1st α | 2nd α | 3rd α | 4th α | Bottom Adjacent α |
| 0 | 16 and below | 0 | 0 | 8 | 20 | 8 | 0 | 0 |
| 1 | 17, 18 | 0 | 0 | 9 | 18 | 9 | 0 | 0 |
| 2 | 19, 20 | 0 | 0 | 10 | 16 | 10 | 0 | 0 |
| 3 | 21, 22 | 0 | 1 | 10 | 14 | 10 | 1 | 0 |
| 4 | 23, 24 | 0 | 2 | 9 | 14 | 9 | 2 | 0 |
| 5 | 25, 26 | 0 | 3 | 9 | 12 | 9 | 3 | 0 |
| 6 | 27, 28 | 0 | 4 | 9 | 10 | 9 | 4 | 0 |
| 7 | 29, 30 | 1 | 5 | 7 | 10 | 7 | 5 | 1 |
| 8 | 31 and above | 2 | 5 | 7 | 8 | 7 | 5 | 2 |

| Filter # | Font Size | Weight Factors | | | | | | |
|---|---|---|---|---|---|---|---|---|
| | | Top Adjacent α | 0th α | 1st α | 2nd α | 3rd α | 4th α | Bottom Adjacent α |
| 0 | 16 and below | 0 | 0 | 8 | 20 | 8 | 0 | 0 |
| 1 | 17, 18 | 0 | 0 | 9 | 18 | 9 | 0 | 0 |
| 2 | 19, 20 | 0 | 0 | 10 | 16 | 10 | 0 | 0 |
| 3 | 21, 22 | 0 | 1 | 10 | 14 | 10 | 1 | 0 |
| 4 | 23, 24 | 0 | 2 | 9 | 14 | 9 | 2 | 0 |
| 5 | 25, 26 | 0 | 3 | 9 | 12 | 9 | 3 | 0 |
| 6 | 27, 28 | 0 | 4 | 9 | 10 | 9 | 4 | 0 |
| 7 | 29, 30 | 1 | 5 | 7 | 10 | 7 | 5 | 1 |
| 8 | 31 and above | 2 | 5 | 7 | 8 | 7 | 5 | 2 |

Fig. 4

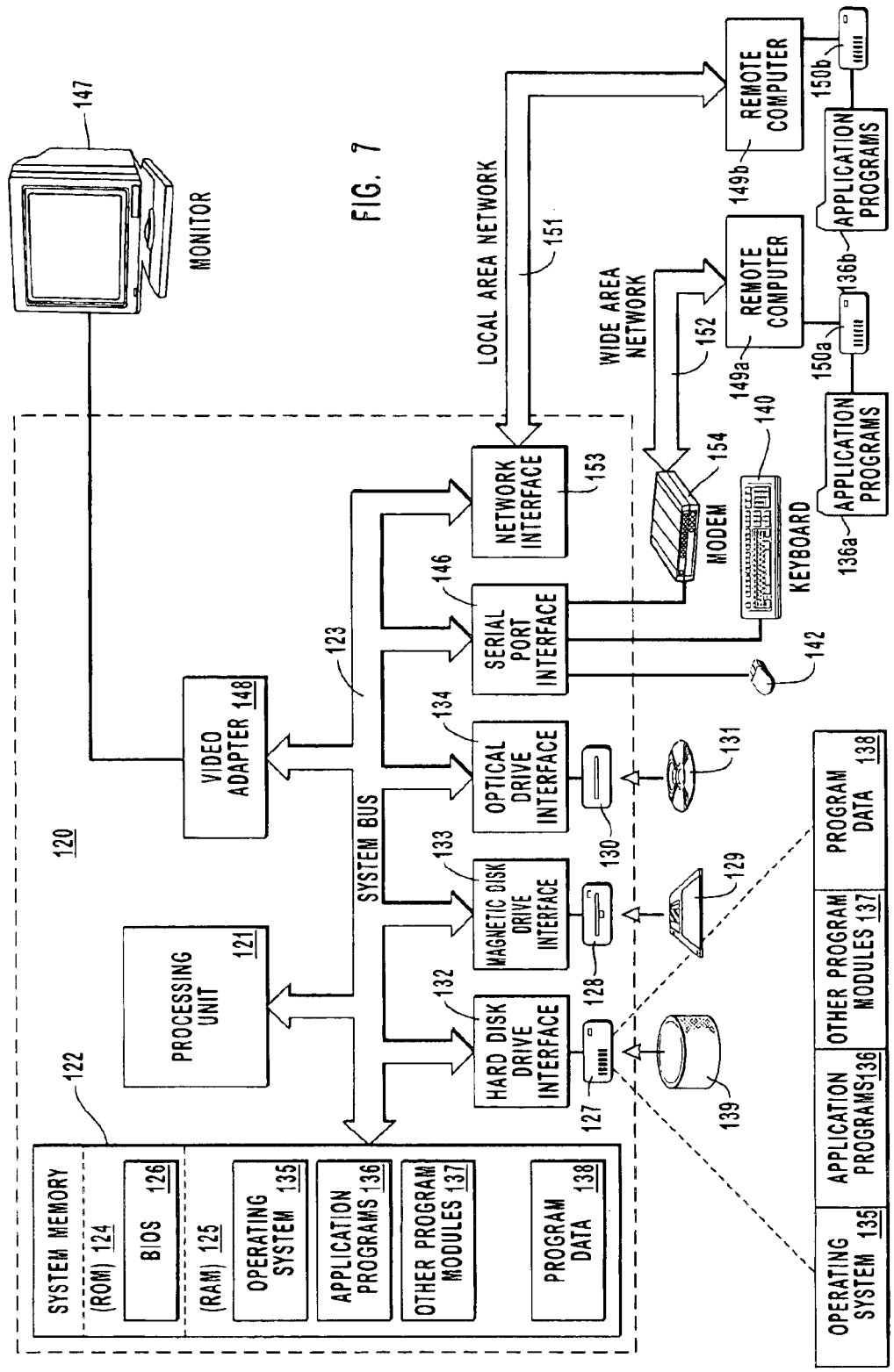

TYPE SIZE DEPENDENT ANTI-ALIASING IN SUB-PIXEL PRECISION RENDERING SYSTEMS

BACKGROUND OF THE INVENTION

1. The Field of the Invention

The present invention extends to both methods and systems for rendering images. In particular, the present invention relates to selecting different anti-aliasing filters to be applied to objects of image data rendered with pixel sub-component precision based on the attributes of the rendered object.

2. Background and Relevant Art

Graphics images are typically stored at sufficiently high resolutions to allow for faithful rendering of the characters of the graphics image such that the human eye cannot perceive irregularities or distortions in the characters, assuming that the display device on which the images are displayed has a sufficiently high resolution. Liquid crystal display (LCD) devices are one of the most common types of display devices on which images can be displayed. The complexity and manufacturing requirements of LCD display devices are such that the resolution of typical LCD display devices is lower than the resolution supported by many graphics formats.

LCD display devices generally include a series of pixels arranged in rows and columns. Each pixel includes colored pixel sub-components that together are used to create variations in the luminosity and hue of the pixel. Typically, LCD display devices have pixel sub-components that are aligned in vertical (or less commonly, horizontal) stripes of same-colored elements, although other patterns exist. When text characters are rendered on an LCD screen, the pixels are assigned a luminosity and hue to depict the background and foreground colors of the characters. The number of pixels on a display device and the size of the device determine the resolution of the display device. When graphics images are rendered at the lower resolutions of typical LCD display devices, distortions in the rendered image become noticeable, particularly at the edges of the characters of the image data. Such variations and distortions in the rendered character include aliasing. Aliasing arises from high spatial frequencies of the original image aliasing down to low spatial frequencies on the display. Aliasing causes the edges of characters to appear jagged or stair-stepped. The jagged or stair-stepped appearance resulting from aliasing is often most apparent on the diagonal or curved portions of characters of an image where the edge of the character approaches horizontal. Aliasing is also most apparent on display devices that do not provide a sufficient number of pixels to accurately represent such portions of characters.

A variety of anti-aliasing techniques have been developed to compensate for the distortions created in rendering images on lower resolution display devices. The traditional method of anti-aliasing, often referred to as gray scaling, blurs the edges of the aliased characters. While the edges of anti-aliased characters are depicted with less clarity, the aliasing in the images becomes less perceptible to the human eye. As a result, the image appears to be more accurately rendered. Another technique that has been utilized to minimize the distortions of aliased images is pixel sub-component precision rendering applied in the direction perpendicular to the stripes of same-colored pixel sub-components of the LCD display device. In particular, individual pixel sub-components are used as separate luminous intensity sources with different portions of the image being mapped to the individual pixel sub-components of the pixels. This technique improves the resolution of the image in the direction perpendicular to the stripes and enables character edges to be placed at boundaries between pixel sub-components. Accordingly, this rendering process reduces the aliasing effect for character features that are nearly vertical, but does not have an appreciable effect in reducing aliasing in features that are nearly horizontal.

The degree to which aliasing is apparent on characters rendered utilizing pixel sub-component positioning as described above depends in part on the font size of the character being rendered. Smaller font sizes tend to exhibit less visible aliasing, while characters displayed using larger fonts can appear uneven and jagged.

FIG. 1A illustrates how pixel sub-component precision rendering can result in large font characters having uneven or jagged edges in regions of the characters that are nearly horizontal. A portion of a display device 1 is illustrated having a grid of pixels 2, on which a portion of a character 4 is displayed. Curvilinear segments 4a represent the underlying image data that is processed to display the character, while segments 4b represent the boundaries of the image that are displayed on display device as a result of segments 4a. Character 4 is depicted at a large font size typical of headline fonts sizes of 25 points or greater. Each pixel 2 has three pixel sub-components (e.g., red, green, and blue pixel sub-components), and each pixel sub-component is separately controlled to represent spatially different portions of the character, which results in increased resolution in the horizontal direction. However, because the resolution is relatively lower in the vertical direction, and because the characters having large font sizes tend to have diagonal edges that are aligned in a nearly horizontal orientation over large numbers of pixels (e.g., portion 8), aliasing effects in the vertical direction can be quite pronounced.

With reference now to FIG. 1B, a second character 6 is displayed with sub-pixel precision on the grid of pixels 2. The second character 6 is depicted at a small font size, such as is often used for rendering text. Curvilinear segments 6a represent the underlying image data that is processed to display the character, while segments 6b represent the boundaries of the image that is displayed on display device as a result of segments 6a. Because characters rendered in smaller fonts tend to have smaller radii of curvature and portions thereof that are nearly horizontal tend to span fewer pixels, the jaggedness of nearly horizontal portions of smaller characters is often a less noticeable problem as shown in FIG. 1B.

For the larger font size character 4 of FIG. 1A or the smaller font size character 6 of FIG. 1B, anti-aliasing filters in the vertical direction can be applied to reduce perceived aliasing effects in the vertical direction. One such anti-aliasing technique is gray scaling, which results in pixel sub-components at the edges of the characters having a luminous intensity between that of the foreground and background color. While gray scaling reduces the perception of aliasing, it also blurs the character edges. For characters that have relatively wide character features, such as character 4 of FIG. 1A, blurring of the edges is not a significant problem, since boundary pixel sub-components represent a relatively small proportion of the pixel subcomponents used to render the character. However, for smaller characters, such as character 6 of FIG. 1B, blurring the edges of the characters can result in making the character difficult to see. Thus, applying conventional anti-aliasing techniques to characters, such as characters 4 and 6, result in poorly defined small font characters, whereas applying no anti-aliasing to such characters results in noticeable aliasing in large font characters.

BRIEF SUMMARY OF THE INVENTION

The present invention extends to methods and systems for rendering images. In particular, the present invention relates to selecting different anti-aliasing filters to be applied to objects of image data rendered with pixel sub-component precision based on the attributes of the rendered object. This enables anti-aliasing filters to be tailored to the unique requirements of different font sizes. Large font sizes benefit from a large amount of anti-aliasing in the direction parallel to the striping of the pixel sub-components. The large number of pixels depicting character stems of large font sizes makes the blurred edges of gray-scaled characters less significant. Small font sizes are rendered faint and less readable when exposed to a large amount of gray scaling. Accordingly, by applying a small amount of anti-aliasing or none at all for characters at small font sizes, the desired contrast at character edges can be maintained.

In one embodiment of the present invention a plurality of different anti-aliasing filters are provided. Each of the plurality of anti-aliasing filters provides a different amount of anti-aliasing in the direction parallel to the striping of the pixel sub-components. When the processing device renders an image, the font size of a character is identified and a corresponding anti-aliasing filter is selected from one of the plurality of different anti-aliasing filters. The anti-aliasing filter selected for small font sizes provides a small amount of anti-aliasing or none at all. The anti-aliasing filter selected for large font sizes provides a relatively large amount of anti-aliasing. The anti-aliasing filters selected for intermediate font sizes provide intermediate amounts of anti-aliasing. As the font sizes of the characters progress from small to large, the amount of anti-aliasing provided by the selected filters increases.

In one embodiment, a selected filter is utilized for multiple font sizes in a range of font sizes. In an alternative embodiment, each selected filter corresponds with a single, different font size. The plurality of filters can be arranged such that an anti-aliasing filter is selected which provides a small amount of anti-aliasing for all characters having a font size below a given lower font-size threshold. Characters rendered utilizing the anti-aliasing filter for small font sizes approximate characters in which no anti-aliasing is applied. Similarly, an upper font-size threshold can be selected above which an anti-aliasing filter is selected which provides a relatively large amount of anti-aliasing. Font sizes intermediate to the upper and lower font-size thresholds are assigned filters providing intermediate levels of anti-aliasing.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 4 depicts an illustrative data structure having a plurality of weighted anti-aliasing filters.

FIG. 7 is a schematic diagram depicting an illustrative operating environment in which the present invention can be utilized.

DETAILED DESCRIPTION OF THE PREFERRED EMBODIMENTS

The present invention extends to both methods and systems for rendering images. In particular, the present invention relates to selecting an anti-aliasing filter to be applied to a character rendered with pixel sub-component precision based on the font size of the character to be rendered. This enables the degree of anti-aliasing applied to the characters to be based on the unique characteristics of different font sizes. The anti-aliasing filter is applied in the direction parallel to the pixel sub-component striping. Large font sizes benefit from a large amount of anti-aliasing in the direction parallel to the striping of the pixel sub-components. As mentioned herein, the large number of pixels depicting character features of large font sizes makes gray scaled edges less noticeable. Small font sizes are rendered faint and less readable when a large amount of gray scaling is applied. Accordingly, by applying a small amount of anti-aliasing for characters at small font sizes, the contrast needed to clearly render such characters can be maintained.

In one embodiment of the present invention a plurality of different anti-aliasing filters are provided. Each of the plurality of anti-aliasing filters supplies a different amount of anti-aliasing. When the processing device renders a character, the font size of the character is determined and a corresponding anti-aliasing filter is selected from one of the different anti-aliasing filters. At small font sizes, the selected filters provide a small amount of anti-aliasing. At large font sizes the selected filters provide a large amount of anti-aliasing. At intermediate font sizes the selected filters provide intermediate amounts of anti-aliasing that increase as the font size of the character progresses from smaller to larger.

I. Sampling of Image Data

Figure 1A:
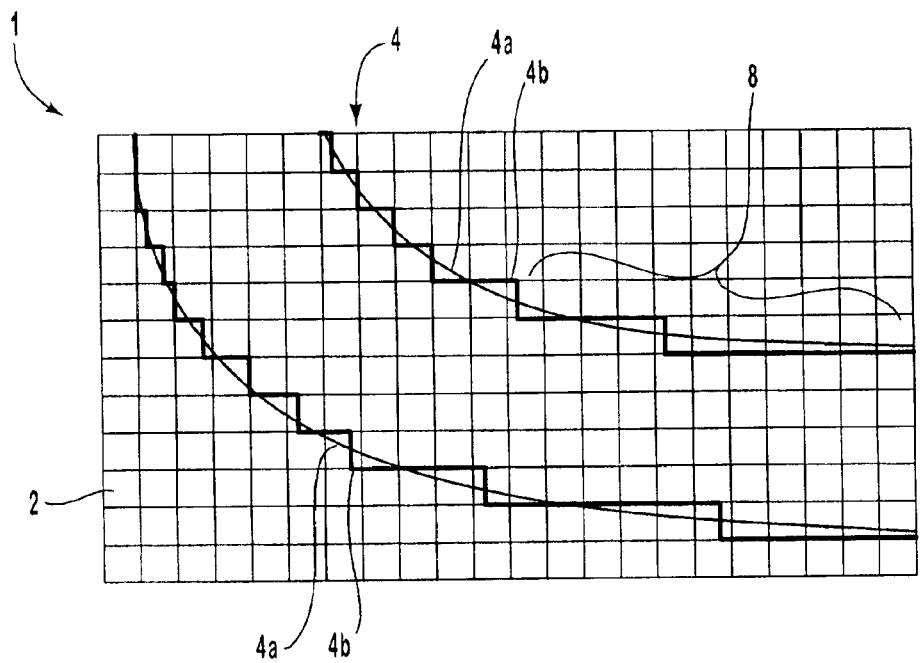
FIG. 1A illustrates the manner in which pixel sub-component rendering can result in large font size characters having uneven or jagged edges.
Figure 1B:
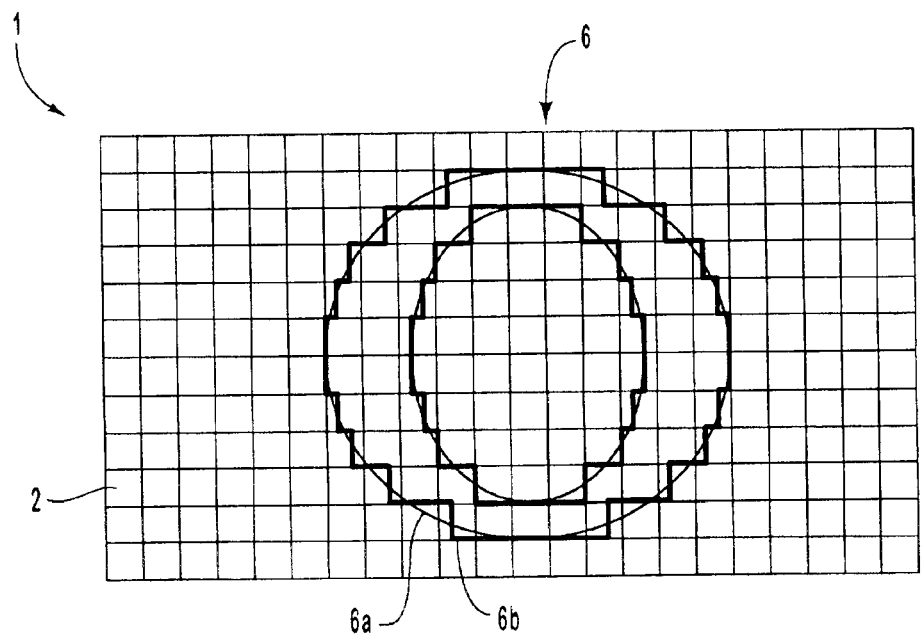
FIG. 1B illustrates how the uneven and jagged edges of small font size characters rendered with sub-pixel precision are less noticeable than the edges of larger font sizes.
Figure 2:
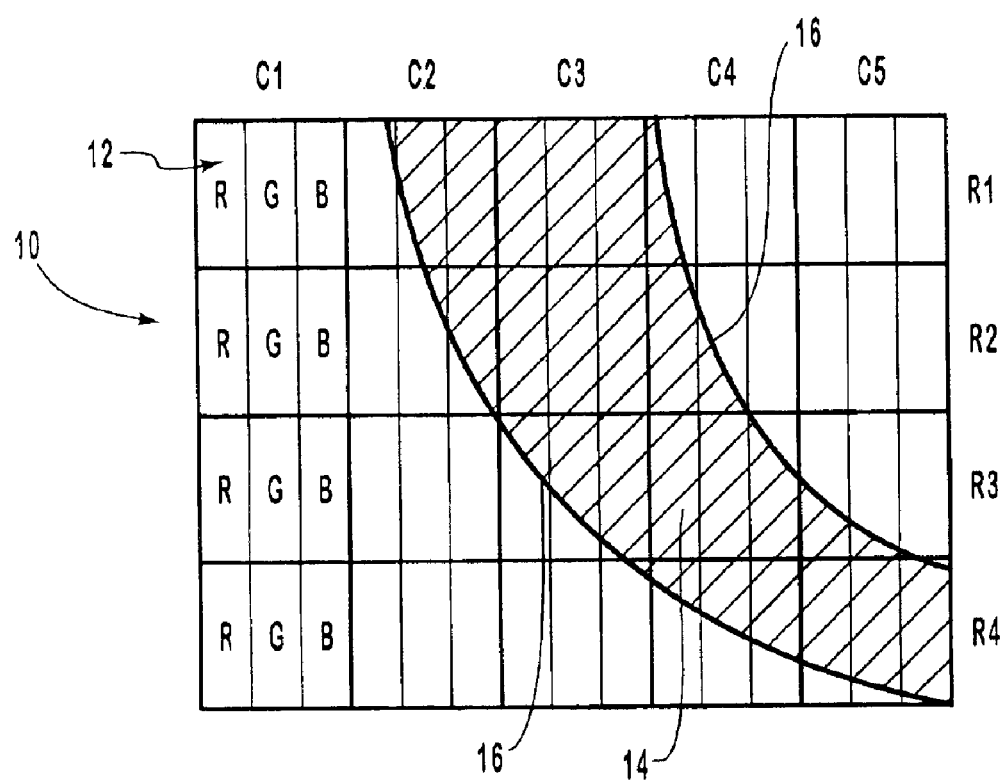
FIG. 2 illustrates a portion of an LCD display device with image data superimposed thereon.

Prior to describing the use of anti-aliasing filters, reference will be made to FIG. 2, which depicts general principles associated with the steps of rendering image that are typically conducted prior to applying anti-aliasing filters to one or more characters in an image. FIG. 2 illustrates a pixel grid 10 on a region of an LCD display device that includes pixels that in turn include pixel sub-components. Pixels on the pixel grid 10 are arranged in a series of columns (C1–C5) and a series of rows (R1–R4). First pixel 12 is presented to illustrate the way in which pixels depict the characters of a graphics image on a typical LCD display device. First pixel 12 corresponds to column C1 and row R1. The first pixel 12 includes red, green, and blue pixel sub-components arranged to be horizontally adjacent to one another. The other pixels of the LCD display device, including the pixels that are vertically adjacent to pixel 12 also include corresponding red, green, and blue pixel sub-components. Thus, the pixel sub-components of vertically adjacent pixels on an LCD display device form stripes of same-colored pixel sub-components. While the present invention is primarily described herein in reference to vertical stripes of same-colored pixel sub-components, those of skill in the art will recognize that the invention is also applicable to a variety of other configurations including, but not limited to, horizontal striping and diagonal striping.

FIG. 2 also illustrates a portion of a character 14 superimposed over pixel grid 10. The image data that is processed according to the invention defines the character 14 in terms of the shape of the outline 16 of the character and the foreground and background colors that are used to render the character. To render character 14, a rasterizer first interprets the graphics instructions, fitting the outlines 16 of image 14 to the pixel grid 10. Once the outlines of character 14 are fitted to the pixel grid 10, the rasterizer scan-converts the optionally grid-fitted outlines and fills samples corresponding to the scan converted outlines into a bitmap. A more detailed discussion of the grid-fitting, scan conversion, and sampling operations that can be used with the invention is presented in U.S. Pat. No. 6,219,025, which is incorporated herein by reference. In one embodiment, a string consisting of multiple characters is rasterized by first grid-fitting all of the characters of the string, then scan converting the entire string. In another embodiment, a non-character graphical object is typically not grid-fitted, but scan-converted with algorithms known in the art. The rasterization of any of these graphical objects will produce a bitmap.

Figure 3A:
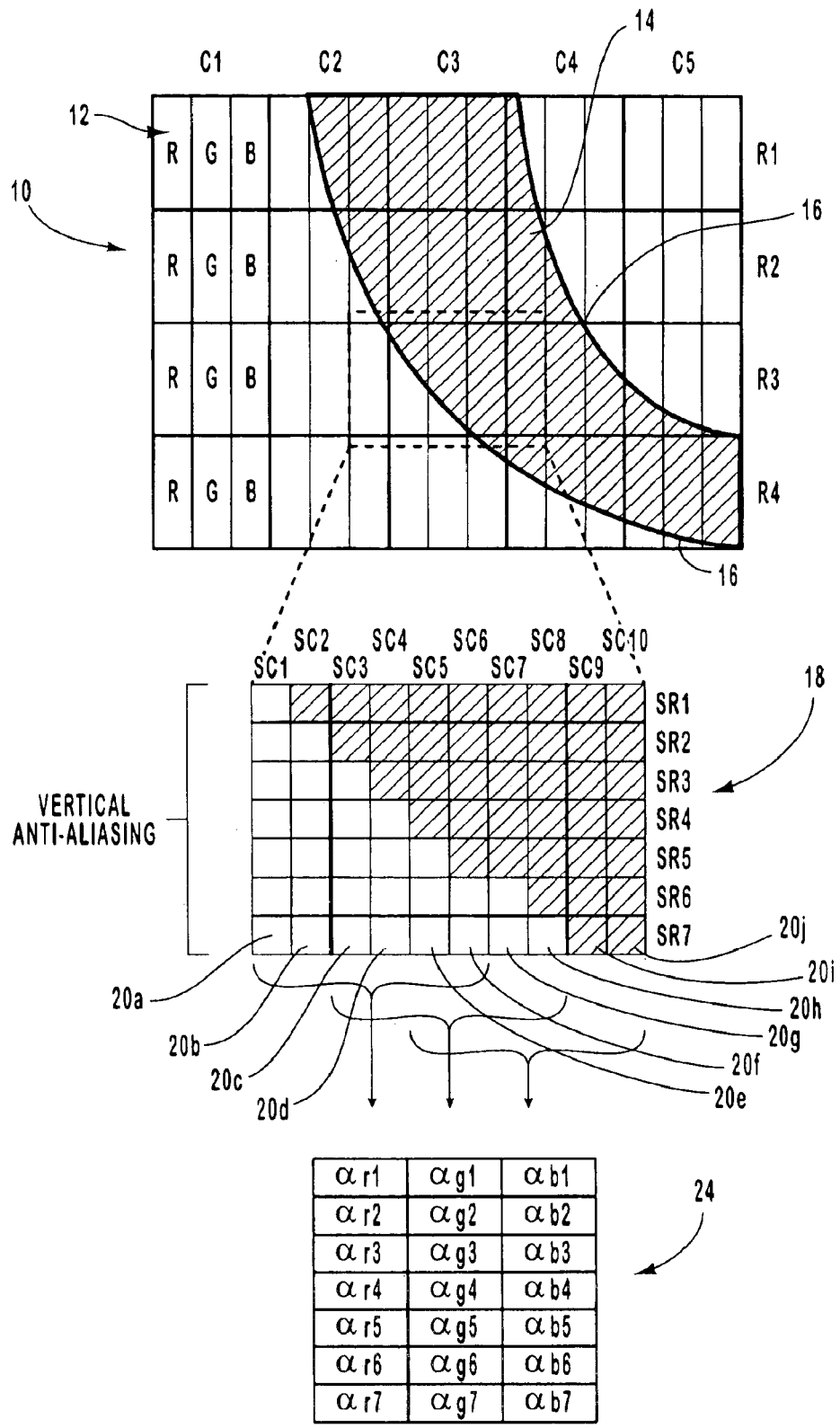
FIG. 3A illustrates the manner in which displaced sampling is used to generate an array of intermediate alpha values that are to be used for vertical anti-aliasing.

FIG. 3A illustrates a portion of a bitmap 18 that has been generated as described above by grid-fitting, scan-converting, and sampling character 14, or other graphical objects. The bitmap created using the samples of the image data is used to generate the luminous intensity values that are applied to the red, green, and blue pixel sub-components of the LCD display device. Moreover, the bitmap specifies which of the samples fall within the outline 16 of character 14 and which fall outside. It is also noted that multiple samples are obtained for each region of the image data that corresponds to a full pixel on the display device. Although the oversampling factors that determine the number of samples per pixel can vary, depending on the particular implementation of the invention, in general, multiple samples are obtained in both the horizontal and vertical directions per pixel. In the example illustrated in FIG. 3A, the oversampling factor is 6 in the horizontal direction and 5 in the vertical direction. The oversampling factor in the horizontal direction (i.e., perpendicular to the stripes of the display device) enables different sets of samples to be mapped to each of the pixel sub-components of the pixels, thereby enhancing the resolution in the horizontal direction and providing anti-aliasing. The oversampling factor in the vertical direction (i.e., parallel to the stripes of the display device) enables the vertical anti-aliasing filters to be applied.

The portion of bitmap 18 illustrated in FIG. 3A represents the portion of the bitmap used according to this embodiment of the invention to apply the anti-aliasing filters. In particular, the region of bitmap 18 includes columns SC1–SC10 and rows SR1–SR7. The heavier vertical and horizontal lines that bound columns SC3–SC8 and rows SR2–SR6 correspond to the boundaries of the pixel of the display device. Thus, in general, the region of bitmap 18 to which the anti-aliasing filters of the invention are applied corresponds to the samples within the boundary of the corresponding pixel as well as one or more rows and columns of adjacent pixels. Moreover, the regions of the bitmap used to apply anti-aliasing to other pixels are mutually overlapping.

The number of rows of samples corresponds with number of samples in the vertical direction as dictated by the vertical overscaling factor plus the number of adjacent samples required for the vertical anti-aliasing filters. In one embodiment of the present invention, the number of vertically adjacent samples provided is determined according to the requirements of the plurality of different anti-aliasing filters. The anti-aliasing filters of the invention utilize samples of the image data positioned outside of the region that corresponds to a particular pixel to determine luminous intensity values to be applied to the pixel sub-components of the pixel. As described in greater detail below, the vertical anti-aliasing filters suppress the high vertical frequencies in bitmap 18 and thereby reduce the jagged appearance that would otherwise be exhibited. A tradeoff for this anti-aliasing processing is that the contrast that would otherwise exist between the pixel sub-components that represent the foreground color of the character and the pixel sub-components that represent the background color is generally reduced.

In the illustrated embodiment, an overscaling factor of 5:1 is utilized in the vertical direction (the direction parallel to the striping of the pixel sub-components.) Additionally, two rows of vertically adjacent samples (SR1 and SR7) are included in the region of bitmap 18 provided. Accordingly, the vertical anti-aliasing filters can be applied to as many as seven rows of samples in the illustrated embodiment. While the illustrated embodiment depicts seven vertically adjacent rows of samples, with SR1 and SR7 being taken from adjacent pixels, it will be appreciated that substantially any number and configuration of samples can be utilized within the scope and spirit of the present invention.

The samples are also mapped in sets of horizontally adjacent columns SC1–SC10. The number of columns corresponds with the number of samples in the horizontal direction as determined by the horizontal overscaling factor, plus the number of horizontally adjacent columns of samples utilized to determine the alpha values corresponding with each RGB triplet. In the illustrated embodiment, a horizontal overscaling factor of 6:1 is utilized. Additionally, two adjacent columns of samples are utilized from the left adjacent pixel, while two adjacent columns of samples are utilized from the right adjacent pixel.

II. Calculation of Alpha Triplet Values

The region of bitmap 18 illustrated in FIG. 3A is used to generate a final alpha triplet value corresponding to the red, green, and blue pixel sub-components of the corresponding pixel. In other words, the region of bitmap 18 is processed to determine the luminous intensity values that are applied to the red, green, and blue pixel sub-components. As described below, the bitmap is processed such that each of the red, green, and blue pixel sub-components represents a spatially different portion of the image data, which has the effect of increasing the resolution of the display in the horizontal direction. Moreover, the bitmap is processed such that aliasing artifacts are reduced in the vertical direction by selecting one of the plurality of anti-aliasing filters according to the invention, based on the font size.

The bitmap 18 is first processed by filtering adjacent sets of samples in each row SR1–SR7 to obtain a set of intermediate alpha values corresponding to the red, green, and blue pixel sub-components. This process is described in detail in reference to row SR7, but is repeated for each of the rows SR1–SR7. FIG. 3A illustrates samples 20a–j corresponding with the horizontally adjacent samples of row SR7. For example, an alpha value $\alpha r7$ is calculated for row SR7 samples 20a–f. The lower case r, g., and b notation in $\alpha r$, $\alpha g$, $\alpha b$ indicates that these alpha values are merely intermediate rather than being the final $\alpha R$, $\alpha G$, $\alpha B$ values that are to be eventually used to control the pixel sub-components. In one embodiment, a value of 0 or 1 is assigned for each sample depending on whether the sample corresponds with the foreground color (e.g, black) or the background color (e.g., white) of the character. These values of 0 or 1 for each of the samples 20a–f are then totaled or averaged to determine an alpha value $\alpha r7$.

The alpha value $\alpha g7$ for row SR7 is determined in a similar manner using samples 20c–h. The alpha value $\alpha b7$ for row SR7 is determined using samples 20e–j. In summary, the processing device translates the horizontally adjacent samples for each row into triplets of alpha values, with one alpha value being generated for each of the three pixel sub-components. Alpha values for each of the pixel sub-components are calculated for each of the other rows SR1–SR6 utilizing the methodology described with respect to row SR7 to generate the array of intermediate alpha values 24 of FIG. 3A. A variety of methods and filters can be utilized to determine the intermediate alpha values within the scope and spirit of the present invention.

III. Vertical Anti-Aliasing Filter Selection

Figure 3B:
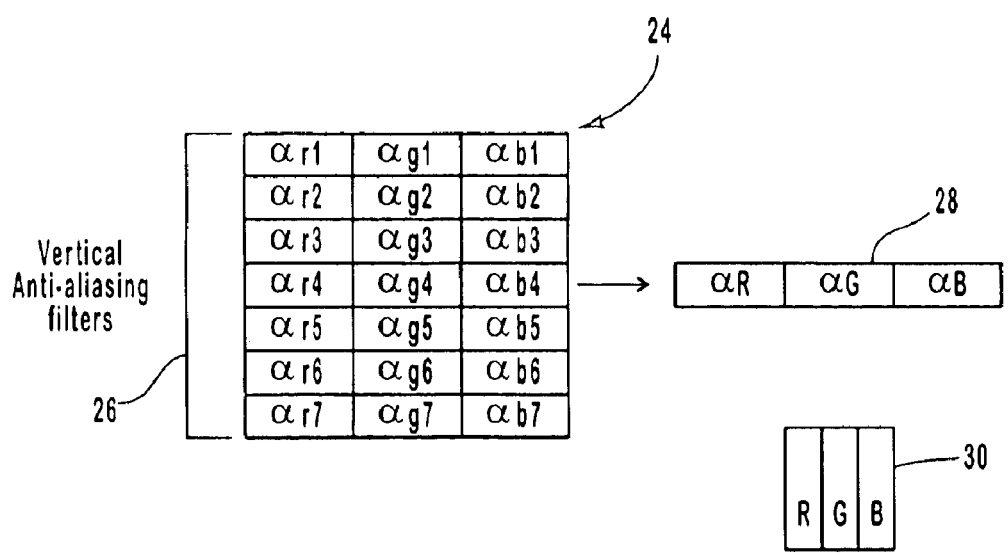
FIG. 3B illustrates the application of a selected vertical anti-aliasing filter to the intermediate alpha values of FIG. 3A.

Once the intermediate alpha values for the region of the bitmap 18 that corresponds to a particular pixel have been calculated for each of the rows SR1–SR7, an anti-aliasing filter is selected based on the font size of the character. The anti-aliasing filter is selected from a plurality of anti-aliasing filters that are specified for use with particular font sizes. The anti-aliasing filters are adapted to suppress high vertical frequencies in bitmap 18. FIG. 3B illustrates the array of intermediate alpha values 24 that were generated as described above in reference to FIG. 3A. The selected anti-aliasing filter 26 of FIG. 3B is applied in the direction parallel to the striping of the display device (i.e. in the direction orthogonal to the direction in which the horizontal filter is applied) to convert the intermediate alpha values 24 to a final set of alpha values 28 ($\alpha R$, $\alpha G$, $\alpha B$) that are used to control the red, green, and blue pixel sub-components 30 of the corresponding pixel.

The anti-aliasing filter 26 is selected from among a plurality of available filters so as to provide a degree of anti-aliasing that has been determined to be appropriate based on the font size of the character that is being displayed. In general, relatively large font sizes result in a filter 26 that provides a relatively large amount of anti-aliasing, whereas relatively small font sizes result in a filter 26 that provides a relatively small amount of anti-aliasing, or none at all.

In one embodiment of the present invention, an anti-aliasing filter providing a first amount of anti-aliasing is selected for all characters below a given font size. In another embodiment an anti-aliasing filter providing a second, greater amount of anti-aliasing is selected for all characters above a given font size. In yet another embodiment a lower font-size threshold is provided for all font sizes below a given font size. An upper font-size threshold is provided for all font sizes above a given font size. Characters having font sizes between the lower font-size threshold and upper font-size threshold are anti-aliased using one or more anti-aliasing filters adapted to provide an intermediate amount of anti-aliasing.

The invention can be applied to documents having characters with different font sizes, resulting in different anti-aliasing filters being applied to the different characters of the document. For example, during the rendering of such an image, a first anti-aliasing filter is selected based on a first font size of a first character to be displayed. As a part of the process of displaying the first character, the first anti-aliasing filter is applied to the first character. A different second anti-aliasing filter is selected based on a second font size of a second character having a font size that is larger than the font size of the first character. As a part of the process of displaying the second character, the second anti-aliasing filter is applied to the second character. The amount of anti-aliasing provided by the second anti-aliasing filter is greater than the amount of anti-aliasing provided by the first anti-aliasing filter. Accordingly, the contrast between the foreground and background luminous intensity values generated as a result of using the second anti-aliasing filter is less than the contrast between the foreground and background luminous intensity values generated as a result of using the first anti-aliasing filter, but the nearly horizontal portions of the characters filtered with the second anti-aliasing filter look smoother than those portions filtered with the first anti-aliasing filter.

The invention can apply different anti-aliasing filters to graphical objects that are not single characters. For example, in one embodiment, a string of characters with the same font size can be rendered with the anti-aliasing filter appropriate for a character of that font size. In an alternative embodiment, graphics consisting of lines and/or curves can be rendered with an anti-aliasing filter that depends on the thickness of the lines and/or curves. Thin lines and/or curves are rendered using a small amount of anti-aliasing, while thick lines and/or curves are rendered using a large amount of anti-aliasing. In one embodiment, the anti-aliasing filter selected to be applied to an object having a particular line/curve width is the same anti-aliasing filter selected for fonts with similar stem widths. In yet another embodiment, graphical objects with appreciable thickness (e.g., filled-in circles, rectangles, etc.) are rendered with an anti-aliasing filter providing the maximum amount of anti-aliasing.

The anti-aliasing filter is applied in the direction parallel to the striping of the pixel sub-components. This provides anti-aliasing to the character in the direction in which sub-pixel rendering fails to provide additional resolution. In the illustrated embodiment, the vertical direction is the direction parallel to the striping of the pixel sub-components. If, however, the striping of the display device is horizontal, the anti-aliasing generated by the selected anti-aliasing filters is applied in the horizontal direction.

In the preferred embodiment of the present invention, the filters comprise weighted filters. Weighted anti-aliasing filters operate by calculating the weighted sums or averages of the vertically adjacent intermediate alpha values. In one embodiment of the present invention, the number of vertically adjacent intermediate alpha values that are given non-zero weightings increases as the font size corresponding to the anti-aliasing filters increases. In other words, filters for larger font sizes in this embodiment are applied to larger numbers of vertically adjacent rows.

The amount of anti-aliasing provided by the filter is based on the weighting factors of the filter. Each filter provides a weighting factor for each of the vertically adjacent alpha triplets for each RGB pixel sub-component. Weighted filters and the corresponding weighting factors will be discussed in greater detail with reference to FIG. 4. The anti-aliasing filters that can be utilized in the context of the present invention are not limited to weighted filters and any of a variety of other filters can be utilized, including those that may be known to those of skill in the art.

With reference now to FIG. 4, there is shown an illustrative data structure having a plurality of weighted anti-aliasing filters. The data structure includes a series of fields. Each field correlates with one of the plurality of anti-aliasing filters assigned to a range of font sizes. The parameters that define the weighting factors applied to the vertically adjacent alpha values of FIG. 3B are also shown. As used in FIG. 4, the top adjacent sample, the $0^{th}$ sample through the $4^{th}$ sample, and the bottom adjacent sample, correspond, respectively, to the intermediate alpha triplet values of rows SR1 through SR7 of FIGS. 3A and 3B. For instance, a weighting factor of 2 to be applied to a "bottom adjacent sample" as defined in the data structure of FIG. 4 means that a weighting factor of 2 is to be applied to the alpha triplet value ($\alpha r7$, $\alpha g7$, $\alpha b7$) of FIGS. 3A and 3B.

As previously mentioned, an anti-aliasing filter is selected from the plurality of different anti-aliasing filters based on the font size of the character to be displayed. In the data structure of FIG. 4, nine weighted filters numbered 0 through 8 are provided. While the illustrated embodiment of the present invention includes nine weighted filters, any number of filters, other than a single filter, can be used in the context of the present invention.

Filter 0 corresponds with font sizes of 16 and below. In the illustrated embodiment, the font size of 17 is the lower font-size threshold below which filter 0 is selected to provide the desired amount of anti-aliasing. Filter 8 corresponds with font sizes of 31 and above. In the illustrated embodiment, the font size of 30 is the upper font-size threshold above which filter 8 is selected to provide the desire amount of anti-aliasing. Filters 1 through 7 correspond with font sizes between 16 and 31, with each filter representing two font sizes. While the selection of anti-aliasing filters is discussed in the context of font sizes, it will be appreciated that the method of determining the size of the character to be rendered need not be based on a strict interpretation of font size. For example, in one embodiment, the pixels per em (ppem) can be used to calculate the size of the image to be rendered. Additionally, for graphic objects stem width, line thickness, or other attributes of the object can be used to select the appropriate anti-aliasing filter. There are a variety of methods and configurations by which the size of the character to be rendered can be determined within the scope and spirit of the present invention.

As previously mentioned, characters having large font sizes generally benefit from a large amount of anti-aliasing. Accordingly, filter 8 is selected for characters having font sizes 31 and larger due to the large amount of anti-aliasing provided by filter 8. The amount of anti-aliasing provided by filter 8 is determined based on the weighting factors for each of the vertically adjacent samples of filter 8. Filter 8 provides a smaller weighting factor for the bottom and top adjacent samples with a gradual increase in the weighting factors applied to alpha values, or samples, nearer the center of the pixel (see FIGS. 3A and 3B). Accordingly a large amount of anti-aliasing is provided by filter 8 to the character edges.

Filter 0 provides a small amount of anti-aliasing in the vertical direction. The weighting factors provided by filter 0 are zero for all but the three vertically adjacent alpha values positioned at the center of the pixel. The greatest weighting is applied to the middle sample ($2^{nd}$ sample). In other words, the anti-aliasing filter only uses samples that lie vertically within the pixel with the middle sample being the most important. Accordingly, the luminous intensity value assigned to the pixel sub-components for small font sizes is determined almost entirely by the samples near the center of the region of the bitmap that corresponds to a pixel. Images rendered utilizing anti-aliasing filter 0 are similar to the images rendered utilizing no anti-aliasing, due to the small amount of anti-aliasing provided by filter 0. While filters 8 and 0 are provided as examples of filters used for characters having a substantial difference in font size, it can be seen that the amount of anti-aliasing provided by filters used with relatively larger character size is greater than the amount of anti-aliasing provided by filters used with relatively smaller character sizes.

Figure 5A:
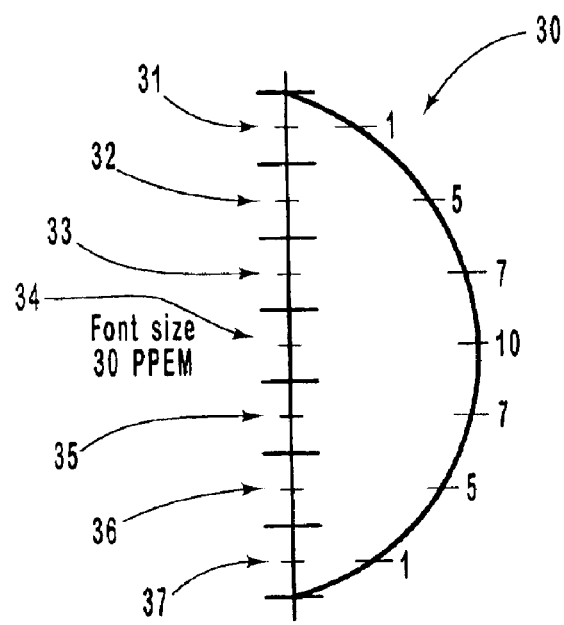
FIGS. 5A and 5B illustrate the manner in which the weighting of the anti-aliasing filters are applied to the alpha values calculated for vertical samples of the alpha triplets associated with the RGB pixel sub-components.
Figure 5B:
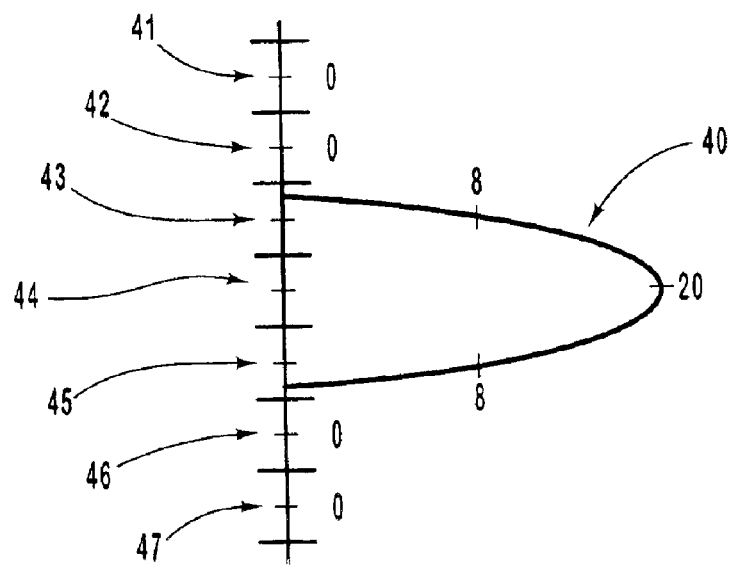

FIGS. 5A and 5B illustrate the manner in which the weighting factors of the anti-aliasing filters are applied to the alpha values calculated for the vertical samples of the RGB pixel sub-components. Lobe 30 represents the weighting factors provided by filter 7 of FIG. 4. In the illustrated embodiment, filter 7 is assigned to characters with font sizes of 29 and 30 and is adapted to provide the high amount of anti-aliasing needed for large font sizes. Lobe 40 represent the weighting factors provided by filter 0 of FIG. 4. In the illustrated embodiment, filter 0 is assigned to characters having font sizes of 16 and below due to the small amount of ant-aliasing provided by filter 0.

A plurality of positions 31–37 on the Y axis corresponding to lobe 30 represent the alpha values of vertically adjacent samples or intermediate alpha values for each RGB pixel sub-component to which the weighting factors are applied. For filter 7, position 31 corresponds with the alpha value of the top adjacent sample and is assigned a weighting factor of 1 on lobe 30. Position 32 corresponds with the alpha value of the $0^{th}$ vertically adjacent sample and is assigned a weighting factor of 5. Position 33 corresponds with the alpha value of the $1^{st}$ vertically adjacent sample and is assigned a weighting factor of 7. Position 34 corresponds with the alpha value of the $2^{nd}$ vertically adjacent sample (sample taken from the middle of the pixel) and is assigned a weighting factor of 10. Positions 35–37 correspond with alpha values of the $3^{rd}$, $4^{th}$, and bottom samples and are assigned weighting factors of 7, 5, and 1, respectively.

Due to the wide and shallow configuration of lobe 30, and the weighting factors corresponding to the lobe 30, a large amount of anti-aliasing is provided by filter 7. The edges of characters to which a large amount of anti-aliasing is applied have a greater amount of intermediate shading than characters to which a small amount of anti-aliasing is applied. The intermediate shading is achieved by assigning luminosity intensity values intermediate to foreground and background pixel sub-components at the edges of the pixels.

In contrast, the narrow and sharp configuration of lobe 40, and the corresponding weighting factors corresponding to lobe 40 result in a small amount of anti-aliasing being provided by filter 0. Weighting factors of zero correspond to positions 41, 42, 46, and 47. Positions 41, 42, 46, and 47 in turn represent the alpha values of the top adjacent sample, $0^{th}$ sample, $4^{th}$ sample, and bottom adjacent sample. Only positions 43, 44, and 45, which correspond with the $1^{st}$ sample, $2^{nd}$ sample, and $3^{rd}$ sample taken from near the middle of the pixel are provided with a non-zero weighting factor.

Figure 6:
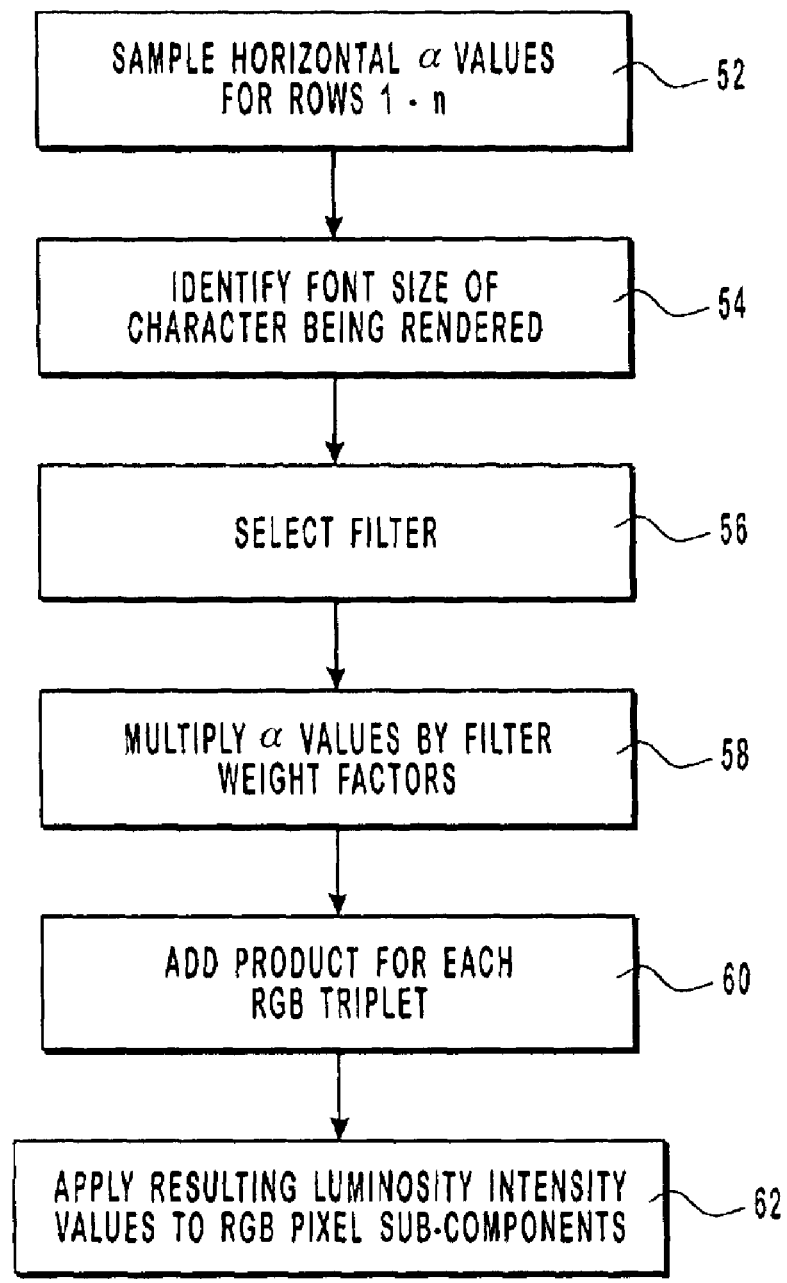
FIG. 6 is a block diagram illustrating the method by which type size dependent anti-aliasing is utilized in the context of the present invention.

FIG. 6 is a block diagram illustrating the method by which type size dependent anti-aliasing is utilized in the context of the present invention. In the method, displaced sampling is utilized to determine the alpha values of horizontally adjacent rows 1–$n$ in step 52. The method of displaced sampling to determine the alpha values for the vertical samples is discussed in greater detail with reference to FIGS. 3A and 3B. Once the alpha values for the horizontally adjacent rows of samples are determined, the font size of the character being rendered is determined in step 54. Based on the font size of the character being rendered, an anti-aliasing filter is selected from a plurality of anti-aliasing filters in step 56. The selected anti-aliasing filter is applied to the character in the vertical direction by multiplying the alpha values for the horizontally adjacent rows of samples by the weighting factors provided by the anti-aliasing filter in step 58. The resulting products of the weighting factors and the alpha values are added for each RGB pixel sub-component to determine the luminous intensity value of the pixel sub-component in step 60. Once the resulting products have been added together, the resulting luminosity intensity values are applied to the RGB pixel sub-components to display the anti-aliased version of the character in step 62.

IV. Exemplary Computing Environment

The embodiments of the present invention may comprise a special purpose or general-purpose computer including various computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

FIG. 7 and the following discussion are intended to provide a brief, general description of a suitable computing environment in which the invention may be implemented. Although not required, the invention has been described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 7, an exemplary system for implementing the invention includes a general purpose computing device in the form of a conventional computer 120, including a processing unit 121, a system memory 122, and a system bus 123 that couples various system components including the system memory 122 to the processing unit 121. The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system (BIOS) 126, containing the basic routines that help transfer information between elements within the computer 120, such as during start-up, may be stored in ROM 124.

The computer 120 may also include a magnetic hard disk drive 127 for reading from and writing to a magnetic hard disk 139, a magnetic disk drive 128 for reading from or writing to a removable magnetic disk 129, and an optical disk drive 130 for reading from or writing to removable optical disk 131 such as a CD-ROM or other optical media. The magnetic hard disk drive 127, magnetic disk drive 128, and optical disk drive 130 are connected to the system bus 123 by a hard disk drive interface 132, a magnetic disk drive-interface 133, and an optical drive interface 134, respectively. The drives and their associated computer-readable media provide nonvolatile storage of computer-executable instructions, data structures, program modules and other data for the computer 120. Although the exemplary environment described herein employs a magnetic hard disk 139, a removable magnetic disk 129 and a removable optical disk 131, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 139, magnetic disk 129, optical disk 131, ROM 124 or RAM 125, including an operating system 135, one or more application programs 136, other program modules 137, and program data 138. A user may enter commands and information into the computer 20 through keyboard 140, pointing device 142, or other input devices (not shown), such as a microphone, joy stick, game pad, satellite dish, scanner, or the like. These and other input devices are often connected to the processing unit 121 through a serial port interface 146 coupled to system bus 123. Alternatively, the input devices may be connected by other interfaces, such as a parallel port, a game port or a universal serial bus (USB). A monitor 147 or another display device is also connected to system bus 123 via an interface, such as video adapter 148. In addition to the monitor, personal computers typically include other peripheral output devices (not shown), such as speakers and printers.

The computer 120 may operate in a networked environment using logical connections to one or more remote computers, such as remote computers 149a and 149b. Remote computers 149a and 149b may each be another personal computer, a server, a router, a network PC, a peer device or other common network node, and typically include many or all of the elements described above relative to the computer 120, although only memory storage devices 150a and 150b and their associated application programs 136a and 136b have been illustrated in FIG. 7. The logical connections depicted in FIG. 7 include a local area network (LAN) 151 and a wide area network (WAN) 152 that are presented here by way of example and not limitation. Such networking environments are commonplace in office-wide or enterprise-wide computer networks, intranets and the Internet.

When used in a LAN networking environment, the computer 120 is connected to the local network 151 through a network interface or adapter 153. When used in a WAN networking environment, the computer 120 may include a modem 154, a wireless link, or other means for establishing communications over the wide area network 152, such as the Internet. The modem 154, which may be internal or external, is connected to the system bus 123 via the serial port interface 146. In a networked environment, program modules depicted relative to the computer 120, or portions thereof, may be stored in the remote memory storage device. It will be appreciated that the network connections shown are exemplary and other means of establishing communications over wide area network 152 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a processing device associated with a display device that has a plurality of pixels, each pixel having a plurality of separately controllable pixel sub-components, a method of rendering an image using an anti-aliasing filter selected from a plurality of anti-aliasing filters based on the font size of a character of the image, comprising the acts of:

storing a data structure that defines a plurality of different anti-aliasing filters;

identifying the attributes of an object of the image to be rendered;

selecting, based on the identified attributes, an anti-aliasing filter from among the plurality of different anti-aliasing filters, wherein at least two of the plurality of different anti-aliasing filters operates by calculating a weighted sum of adjacent samples of image data that represents the image, wherein the amount of anti-aliasing provided by filters selected based on a relatively larger object body thickness is greater than the amount of anti-aliasing provided by filters selected based on relatively smaller object body thickness, wherein the number of adjacent samples, which are used by the anti-aliasing filters used to calculate the weighted sum, increases as the body of the object thickness corresponding to the anti-aliasing filters increases; and applying the selected anti-aliasing filter in a direction parallel to striping of the pixel sub-components.

2. The method of claim 1, further comprising the act of mapping spatially different sets of samples of image data that defines the image to different pixel sub-components of individual pixels so as to display the image with pixel sub-component precision in a direction perpendicular to the striping of the pixel sub-components.

3. The method of claim 1, wherein each of the plurality of anti-aliasing filters provides a different amount of anti-aliasing.

4. The method of claim 1, wherein the object comprises a character and wherein the attributes comprises a font size of the character.

5. The method of claim 4, wherein each of the data structures includes a series of fields, wherein each field correlates with one of the plurality of anti-aliasing filters corresponding to a range of font sizes.

6. The method of claim 5, wherein one of the plurality of filters is applied to any character having a font size lower than a given lower font-size threshold.

7. The method of claim 5, wherein one of the plurality of filters is applied to any character having a font size exceeding a given upper font-size threshold.

8. The method of claim 5, wherein the plurality of anti-aliasing filters includes at least three filters.

9. A computer program product for implementing, in a computer system including a processing device and a display device for displaying an image, the display device having a plurality of pixels, wherein each pixel has a plurality of separately controllable pixel sub-components, a method of selecting an anti-aliasing filter, the computer program product comprising:

a computer-readable medium carrying computer executable instructions for performing the method, wherein the method includes the acts of:

storing a data structure that defines a plurality of different anti-aliasing filters;

identifying the font size of a character of the image to be rendered;

selecting, based on the identified font size, an anti-aliasing filter from among the plurality of different anti-aliasing filters, wherein the plurality of different anti-aliasing filters operates by calculating a weighted sum of adjacent samples of image data that represents the image, wherein the amount of anti-aliasing provided by filters selected based on a relatively larger object body thickness is greater than the amount of anti-aliasing provided by filters selected based on relatively smaller object body thickness, and wherein the number of adjacent samples, which are used by the anti-aliasing filters used to calculate the weighted sum, increases as the body of the object thickness corresponding to the anti-aliasing filter increases; and applying the selected anti-aliasing filter in a direction parallel to striping of the pixel sub-components.

10. The computer program product of claim 9, further comprising the act of mapping spatially different sets of image data that define the image to different pixel sub-components of individual pixels so as to display the image with pixel sub-component precision in a direction perpendicular to the striping of the pixel sub-components.

11. The computer program product of claim 9, wherein the amount or anti-aliasing provided by filters selected based on relatively larger character size is greater that the amount of anti-aliasing provided by filters selected based on relatively smaller character size.

* * * * *

UNITED STATES PATENT AND TRADEMARK OFFICE
CERTIFICATE OF CORRECTION

PATENT NO. : 6,894,701 B2  Page 1 of 1
APPLICATION NO. : 10/146424
DATED : May 17, 2005
INVENTOR(S) : Brown et al.

It is certified that error appears in the above-identified patent and that said Letters Patent is hereby corrected as shown below:

On the title page, item (56), under "Other Publications", in column 2, line 3, delete "Wamock" and insert -- Warnock --, therefor.

In column 2, line 62, delete "subcomponents" and insert -- sub-components --, therefor.

In column 7, line 30, delete "e.g," and insert -- e.g., --, therefor.

In column 12, line 58, delete "computer readable" and insert -- computer-readable --, therefor.

In column 14, line 10, in Claim 1, after "thickness," insert -- and --.

In column 14, lines 49–50, in Claim 9, delete "computer executable" and insert -- computer-executable --, therefor.

In column 15, line 3, in Claim 9, delete "filter" and insert -- filters --, therefor.

In column 16, line 4, in Claim 11, delete "or" and insert -- of --, therefor.

Signed and Sealed this

Twenty-eighth Day of April, 2009

JOHN DOLL
*Acting Director of the United States Patent and Trademark Office*